US007738657B2

(12) United States Patent
Gopal et al.

(10) Patent No.: US 7,738,657 B2
(45) Date of Patent: Jun. 15, 2010

(54) SYSTEM AND METHOD FOR MULTI-PRECISION DIVISION

(75) Inventors: Vinodh Gopal, Westboro, MA (US); Matt Bace, North Andover, MA (US); Gunnar Gaubatz, Worcester, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 11/469,243

(22) Filed: Aug. 31, 2006

(65) Prior Publication Data

US 2008/0069337 A1   Mar. 20, 2008

(51) Int. Cl.
*H04L 9/00* (2006.01)
(52) U.S. Cl. .................. 380/28; 708/650; 708/651; 708/652; 708/653; 708/654
(58) Field of Classification Search ............ 380/28; 708/650–654
See application file for complete search history.

(56) References Cited

U.S. PATENT DOCUMENTS

| | | | |
|---|---|---|---|
| 4,555,784 A | 11/1985 | Wood | |
| 5,105,378 A | 4/1992 | Mori | |
| 6,952,476 B1 | 10/2005 | Mao | |
| 2003/0142818 A1 | 7/2003 | Raghunathan et al. | |
| 2004/0024806 A1* | 2/2004 | Jeong et al. | 708/656 |
| 2004/0230635 A1* | 11/2004 | Ebergen et al. | 708/653 |
| 2005/0027775 A1* | 2/2005 | Harrison et al. | 708/650 |
| 2005/0108613 A1 | 5/2005 | Kobayashi | |
| 2005/0283714 A1 | 12/2005 | Korkishko et al. | |
| 2006/0064454 A1* | 3/2006 | Wang et al. | 708/651 |
| 2006/0156211 A1 | 7/2006 | Edirisooriya | |
| 2007/0244956 A1* | 10/2007 | Dupaquis et al. | 708/650 |
| 2008/0059865 A1 | 3/2008 | Gopal et al. | |
| 2008/0071850 A1* | 3/2008 | Harrison et al. | 708/523 |
| 2008/0162806 A1 | 7/2008 | Gopal et al. | |

FOREIGN PATENT DOCUMENTS

| | | |
|---|---|---|
| JP | 02259359 A | 10/1990 |
| JP | 2000259359 A | 9/2000 |
| WO | 2008027734 A1 | 3/2008 |
| WO | 2008027735 A1 | 3/2008 |

OTHER PUBLICATIONS

"PCI Express Base Specification Revision 1.0", PCI Express (Jul. 22, 2002), 428 pgs.

(Continued)

*Primary Examiner*—Nasser Moazzami
*Assistant Examiner*—Lisa Lewis
(74) *Attorney, Agent, or Firm*—Grossman, Tucker, Perreault & Pfleger, PLLC

(57) ABSTRACT

The present disclosure provides a system and method for performing multi-precision division. A method according to one embodiment may include generating a first product by multiplying a modulus having a most significant bit and/or a least significant bit equal to one and a quotient approximation of the modulus. The method may also include generating the 1's complement of the first product, generating a second product by multiplying the 1's complement and the quotient approximation, normalizing and truncating the second product to obtain a quotient, and storing the quotient in memory. Of course, many alternatives, variations and modifications are possible without departing from this embodiment.

26 Claims, 6 Drawing Sheets

OTHER PUBLICATIONS

"PCI-X Addendum to the PCI Local Bus Specification", PCI Special Interest Group: Revision 1.0a, (Jul. 24, 2000), 240 pgs.

"American National Standard for Information Technology- Fibre Channel- Physical and Signalling Interface-3 (FC-PH-3)", Developed by incits, Where IT all Begins (1998),116 pgs.

"Working Draft American National Standard, Project T10/1601-D", Information Technology- Serial Attached SCSI- 1.1 (SAS-1.1): Revision 1 (Sep. 18, 2003), 464 pgs.

"Intel XScale Core", Developer's Manual (Dec. 2000) 220 pgs.

"Announcing the Advanced Encryption Standard (AES)", Federal Information Processing Standards Publication 197 (Nov. 26, 2001) 51 pgs.

"Data Encryption Standard (DES)", FIPS PUB 46-3 (Oct. 25, 1999) 26 pgs.

"International Search Report and Written Opinion", PCT/US2007/076147 (Dec. 11, 2007)10 Pages.

"Serial ATA: High Speed Serialized AT Attachment, Serial ATA Workgroup", APT Technologies, Inc.: Revision 1.0 (Aug. 29, 2001) 9 pgs.

Huang, L. et al., "An Efficient Multiple-Precision Division Algorithm", Proceedings of the sixth International Conference on Parallel and Distributed Computing, Application and Technologies (PDCAT'05) IEEE.

"International Search Report and Written Openion", PCT/US2007/076149, (Jan. 8, 2008),10 pgs.

Notice of Allowance received for U.S. Appl. No. 11/469,222 mailed on Jun. 4, 2009; 15 pages.

Feghali, Wajdi , et al., "Cryptographic System Component", Intel Ref: P23349, Utility U.S. Appl. No. 11/323,329, filed Dec. 30, 2005.

Feghali, Wajdi , et al., "Cryptography Processing Units and Multiplier", Intel Ref: P22799, Utility U.S. Appl. No. 11/323,993, filed Dec. 30, 2005.

Feghali, Wajdi , et al., "Multiplier", Inetl Ref : P22797, Utility U.S. Appl. No. 11/323,994, filed Dec. 30, 2005.

Feghali, Wajdi , et al., "Programmable Processing Unit", Intel Ref: P22798, Utility U.S. Appl. No. 11/354,404, filed Feb. 14, 2006.

* cited by examiner

SYSTEM AND METHOD FOR MULTI-PRECISION DIVISION

FIELD

The present disclosure describes a system and method for multi-precision division.

BACKGROUND

Encryption algorithms may be classified as either private-key or public-key. Private-key encryption refers to an encryption method in which both the sender and receiver share the same key. Public-key encryption involves two different but related keys. One is used for encryption and one for decryption. Many of today's encryption techniques utilize a public-key/private-key pair. Most public-key algorithms, such as Rivest, Shamir, Adelman (RSA) and Diffie-Helman, perform extensive computations involving many repeated multiplications and divisions. These schemes often have data block sizes of at least 512 to 1024 bits. The multiply and divide capabilities found in most conventional processors are typically not used directly to perform these operations since the size of the operands and vectors used for these calculations renders conventional processors extremely inefficient for such calculations. Therefore, conventional processors may use special algorithms that break down large multiplications and divisions into smaller operations. However, this approach usually requires vast memory resources to store intermediate calculations and a look-up table that is used for rounding and error reduction.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
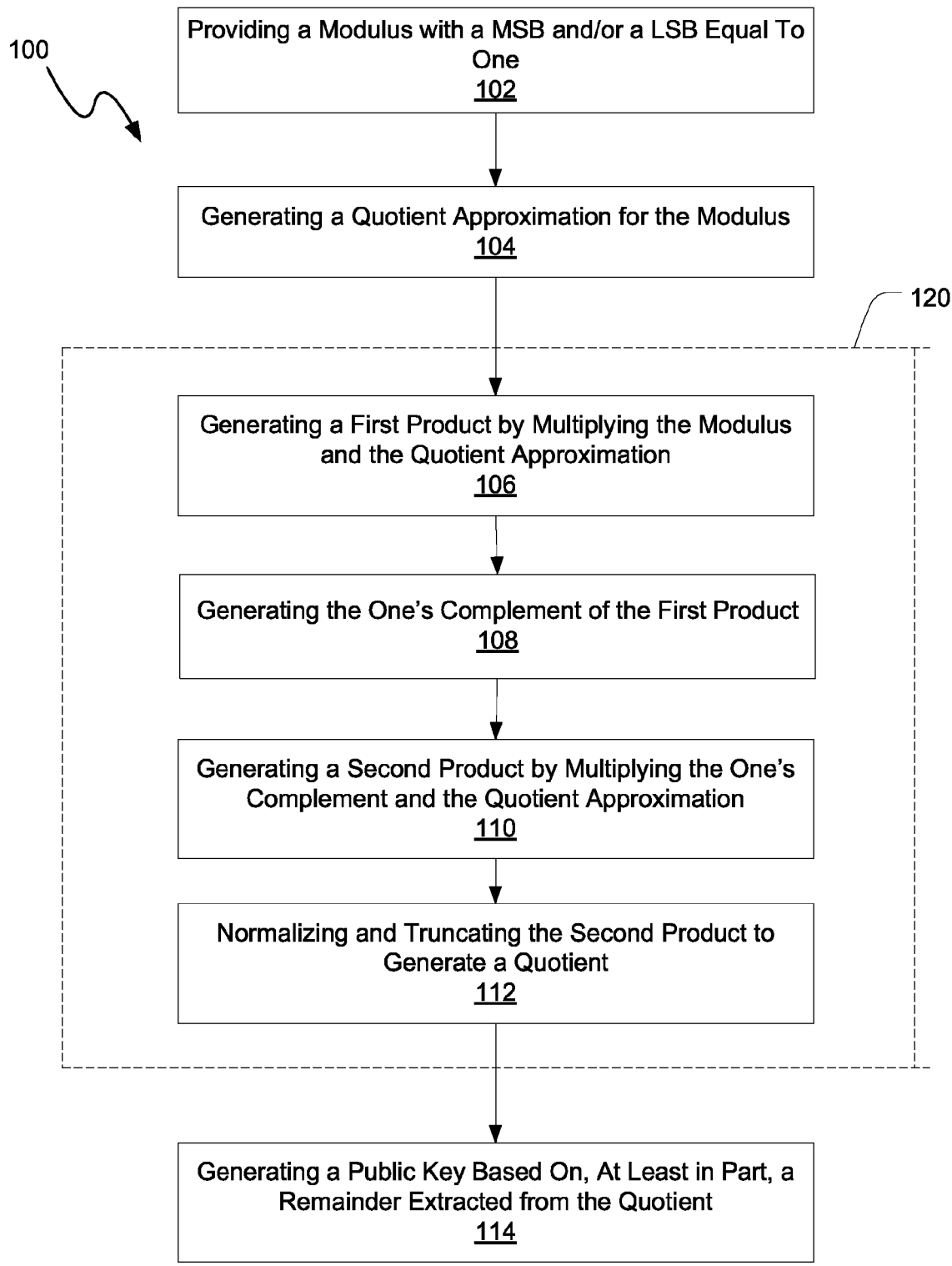
FIG. 1 is a flowchart showing operations in accordance with one embodiment of the present disclosure.

Although the following Detailed Description will proceed with reference being made to illustrative embodiments, many alternatives, modifications, and variations thereof will be apparent to those skilled in the art.

DETAILED DESCRIPTION

Some of the more popular techniques for division are based on the family of Sweeney, Robertson, Tocher algorithms (SRT) that may be implemented for numbers that are less than 64-bits in length. These algorithms perform bit-wise division where at each step a quotient bit is determined based on the most-significant bits of the dividend and divisor combined with a restoring/non-restoring subtraction. The faster techniques rely on non-restoring subtraction and keep intermediate results in a carry-save redundant form and process groups of bits in a cycle (e.g. 4 bits per cycle). However the best-known implementations are limited to a few (fixed number of) bits per cycle and therefore do not scale well as the operand sizes increase.

Some processors such as the IPF (Itanium processors) have designed division using reciprocal approximations via table lookup followed by a few fused-multiply-add (FMA) instructions. This requires a table that provides an initial approximation of the reciprocal and Newton-Raphson steps that double the accuracy of the approximation with each step. This method is slower than a full dedicated SRT hardware divider but is more area-efficient. One of the limitations of the method for double-extended-precision of 64-bits is the fact that the intermediate results have to be rounded with each FMA instruction to 64-bits, making it harder to get an accuracy of 64-bits in the final steps.

During a public key negotiation, for example, between two parties over an untrusted network, each party may generate a public key. The security strength of the key is typically a function of the size (e.g., bit length) of the key. To generate a key, each party may need to solve an equation of the form: $x = g^a \mod m$. Given two integers, $g^a$ and m, $g^a \mod m$ yields the remainder (r) of the division of $g^a$ by m. The difficulty with this calculation is, given the large size of the operands, the division process may require that $g^a$ be reduced at each iteration of the process with respect to mod m. While this can be accomplished using conventional division techniques, this process would prove extremely slow, especially as increased security demands causes key lengths to increase. Barrett's reduction techniques may be used to generate a public key. This technique uses an initial parameter (u), however, current protocols do not address the difficulty in generating the (u) parameter.

Generally, this disclosure describes a system and method for performing multi-precision division to reduce a division problem presented by a modulus operation to a series of multiplication and bit-shifting that may minimize hardware and may obviate the requirement of a look-up table. In one embodiment, the system and method described herein may be used to generate (u) for a Barrett's reduction calculation, and to generate a public key. The present disclosure describes a scalable technique for extremely large integers (e.g., exceeding 4096 bits) iterations in order to increase the accuracy of a quotient estimate. The operations described herein may be used to approximate special moduli used in various protocols, such as, RSA and the Diffie-Hellman key agreement protocol. This disclosure also provides truncation techniques that can eliminate rounding at intermediate steps. Moreover, the present disclosure optimizes subtractions and normalizations to increase the speed of the process. Additionally, the approximations described herein may be monotonic and may yield non-negative integers for many computations. Thus, the present disclosure describes a scalable method for performing multi-precision division that may be faster and, when implemented in a processor, more area efficient.

FIG. 1 is a flowchart 100 illustrating one method consistent with the present disclosure. Flowchart 100 depicts operations that may be used to perform multi-precision division by computing reciprocals on vectors of arbitrary length (e.g., array of words representing large integers). The method of this embodiment may include providing a modulus (e.g., mod m) having a most significant bit (MSB) and/or a least significant bit (LSB) equal to one 102. The modulus may be derived from one or more standard moduli (as may be published in National Institute of Standards and Technology (NIST)) and/or generated using a random number generator and/or pseudo-random number generator and/or proscribed modulus calculation.

The modulus, as referred to herein, may be used to generate a seed that is accurate to x-number of bits, and may be used to generate the remainder of a division process. In one embodiment of the present disclosure the modulus may be an odd number having a number of bits (t). In one example, the modulus may be a multiple of 64 bits, for example, a 1024 bit modulus.

The operations may further include generating a quotient approximation for the modulus using bit-serial calculations 104. The quotient approximation may be generated by the reciprocal of the modulus (e.g., 1/mod m). Further, the quotient approximation may be approximated by using the MSBs (e.g., the first 64-bits) of the reciprocal of the modulus. The bit-serial calculations may be monotonic, therefore all computations may result in non-negative integers. This may greatly increase the speed of the generating a quotient approximation. Moreover, all rounding steps may favor truncation at intermediate steps, which may avoid rounding up at all iterations of the bit-serial calculation. Alternatively, if the modulus is of a special form where the MSBs are all 1's (e.g., the first 64-bits being all 1's), the quotient approximation may be generated as a 1 followed by 0's (e.g., the first bit is a 1, followed by 63 0's).

Once the modulus and a quotient approximation are obtained, this method may include iterative operations 120 to produce a quotient. The iterative operations 120 may include a series of multiplication and bit shifting, as will be described in greater detail below. The iterative operations 120 may include producing a first product by multiplying the modulus and the quotient approximation 106. In an example where the modulus is 1024 bit and the quotient approximation is 64 bits, in the first iteration this first product may have a length of 1088 bits. The next iteration may be a multiplication of the 1024 bit modulus with a quotient approximation of 128 bits. Each iteration may double the quotient approximation This multiplication in the iteration ($x_i*y$) may be replaced by multiplication by ($x_i*y_i$), where $y_i$ are derived from y as the top len most significant bits of y (modulus) rounded up. Xi are the iterative quotient approximations. Here, len=2*length of $x_i$. It is envisioned that all of the multiplications could be performed with either y or $y_i$. Further, portions of y could be used (e.g., the top 512 bits) for the first few iterations, allowing a multiplication by the full y for the final multiplication (In this case, len>512).

Operations according to this embodiment may further include generating the one's complement of the first product 108. This operation may be performed at each of the iterative operations of obtaining the first product (described above). The one's complement may be used to obtain an error term and it may be determined on-the-fly while the first product is being generated, as opposed to waiting for the entire first product prior to computing. This may provide the one's complement operation without incurring any additional delay of memory storage operations for the first product. Operations according to this embodiment may also include generating a second product by multiplying the one's complement of the first product with the quotient approximation 110.

Again, this operation may be performed at each of the iterative operations of obtaining the first product and the one's complement of the first product (described above)

Depending on the bit length of the quotient approximation 104 and the ultimate length of a desired public key, the iterative operations 120 described herein may be repeated until a desired bit length is achieved. In addition, the iterative operations 120 described herein may double the accuracy of the quotient approximation in terms of the number of bits, where each subsequent vector is double the length of the previous vector. As such, the iterative operations described herein may comply or be compatible with Newton-Raphson iterative procedures in the sense of doubling the accuracy of intermediate results at each step (e.g., an associated error term diminishes as the square of the previous term). It should be noted that each iteration of the process performs the two vector multiplications described in 106 and 110. The result of the second multiplication may be normalized and truncated to obtain a quotient 112. Normalization may include, for example, left-shifting the quotient vector by 1 bit position. The result of this operation may generate a quotient vector that is too long, and thus the quotient vector may be truncated by taking the most significant bits to the desired bit length. In some embodiments, the order of the left-shift operation (<<) and the subsequent truncation of the quotient may be switched to yield a faster operation. In other words, truncation and normalization could occur after generating the first product (106) which may allow the vector-shift to execute in fewer cycles on the smaller vector (first product, $x_{i+1}$) rather than on the larger vector of the second product.

Following normalization and truncation, mathematical operations may be utilized to double the accuracy of the quotient and to obtain the exact remainder. For example, one or more subtraction operations may be utilized after the second product is obtained in order to obtain the exact remainder. This may be faster than performing full-vector operations at all operations in the iteration 120 for scalability. The operations may further include generating a public key based on, at least in part, a remainder extracted from the quotient 114.

The operations described herein with reference to FIG. 1 may be scalable for very large integers and the number of cycles needed may be dependent upon the length of the modulus. For example, utilizing these operations for a 2048-bit modulus, as opposed to a 1024-bit modulus, may include an additional pair of multiplying steps (i.e., an additional cycle through the iterative operations 120 of FIG. 1). It should be noted that the result of any of the operations described herein may be stored in memory. Moreover, the operations described herein may be used in accordance with numerous processors, chipsets, System on a Chip, etc.

Table 1 shows a pseudo-code example in accordance with an embodiment of the present disclosure. The pseudo-code of Table 1 may be used for a 1024-bit modulus to generate a 513-bit quotient q of the division 2^1536/m. Here, the modulus m is a 1024-bit number having a MSB and LSB equal to one. The remainder may be extracted with an additional multiply and subtract operation once the quotient is known.

TABLE 1

Given:

Modulus m (y) a 1024-bit number with a msb and lsb =1
A procedure serial__64__quotient that generates a first 64-bit quotient approximation using a bit-serial when a 128-bit number is divided by a 64-bit number (>2^63)
This code describes a procedure vec__mul that produces the product of 2 vectors (this can be written as a number of 512-bit multiplies and adds when the operands are larger than 512-bits)
These operations may be performed on a 64-bit vector processor with two register files A, B TABLE 1-continued Given:

```
//uint64 may be an unsigned 64-bit integer type
Uint64 approx__64(uint64 y__msw){
If (!y__msw == 0) return (2^63); //if y__msw is 64 1s, return 100...0 (1 and 63 0s)
//may provide an initial approx for DH prime moduli of special form &
// may be used to prevent overflow below when incremented
Else {
    New__y__msw = y__msw +1; // round-up; the new y__msw > 2^63 and <2^64
    Return (serial__64__quotient(2^127, new__y__msw));
  }
}
//Assume two arrays of uint64 A[256], B[256]
//y points to A[0], x points to B[0], result points to A[16], p1 points to B[16]
//Note that p1 & result may fit in 32 words each.
Main( ){
X[0] = approx__64(y[15]); //initial approximation
Sx=1; //size of x in words
For(j=1; j<=4; j++){
    Result[sx+15:0] = vec__mul(x[(sx-1):0], y[15:0]); //x*y
    Result = !result; //1s-complement that may approximate [2-x*y]
    P1[2*sx+15:0]= vec__mul(result[sx+15:0], x[(sx-1):0]);
    P1=p1<<1; // left-shift by 1, will set the msb to 1 (normalization)
    X[2*sx-1:0] = p1[2*sx+15:16]; //truncate p1, copy top "2 sx" Msws of p1 into X
    Sx = sx*2; //may double the accuracy of x
}
//q may be the top 513 bits of X4, which may be stored in result
result[7:0]=x4[15:8]<<1;
result[8]=left__shift__carry; //
}
```

Although Table 1 describes the procedure for a 1024-bit modulus, a modulus of any number of different bits may be used. For example, a similar approach could be taken for a 2048-bit modulus to generate a 1025-bit quotient of the division $2^{3072}/m$. Again, the modulus m may be a 2048-bit number with the MSB and LSB equal to one. The pseudo-code of Table 1 is shown in C language, and is provided only as an example that may be extended and/or translated into other machine-readable formats or languages, or into a modular math processor (MMP) program.

The operations shown in flowchart 100 may be used to supply the parameter $\mu$ for Barrett's style reductions. Barrett's reduction is a method of reducing a number modulo another number (e.g., x mod m). Barrett's reduction may be used when numbers that are implemented by multiple precision arithmetic libraries are used, such as when implementing the RSA cryptosystem, which uses modular exponentiation with large (>512 bit) numbers.

Figure 2:
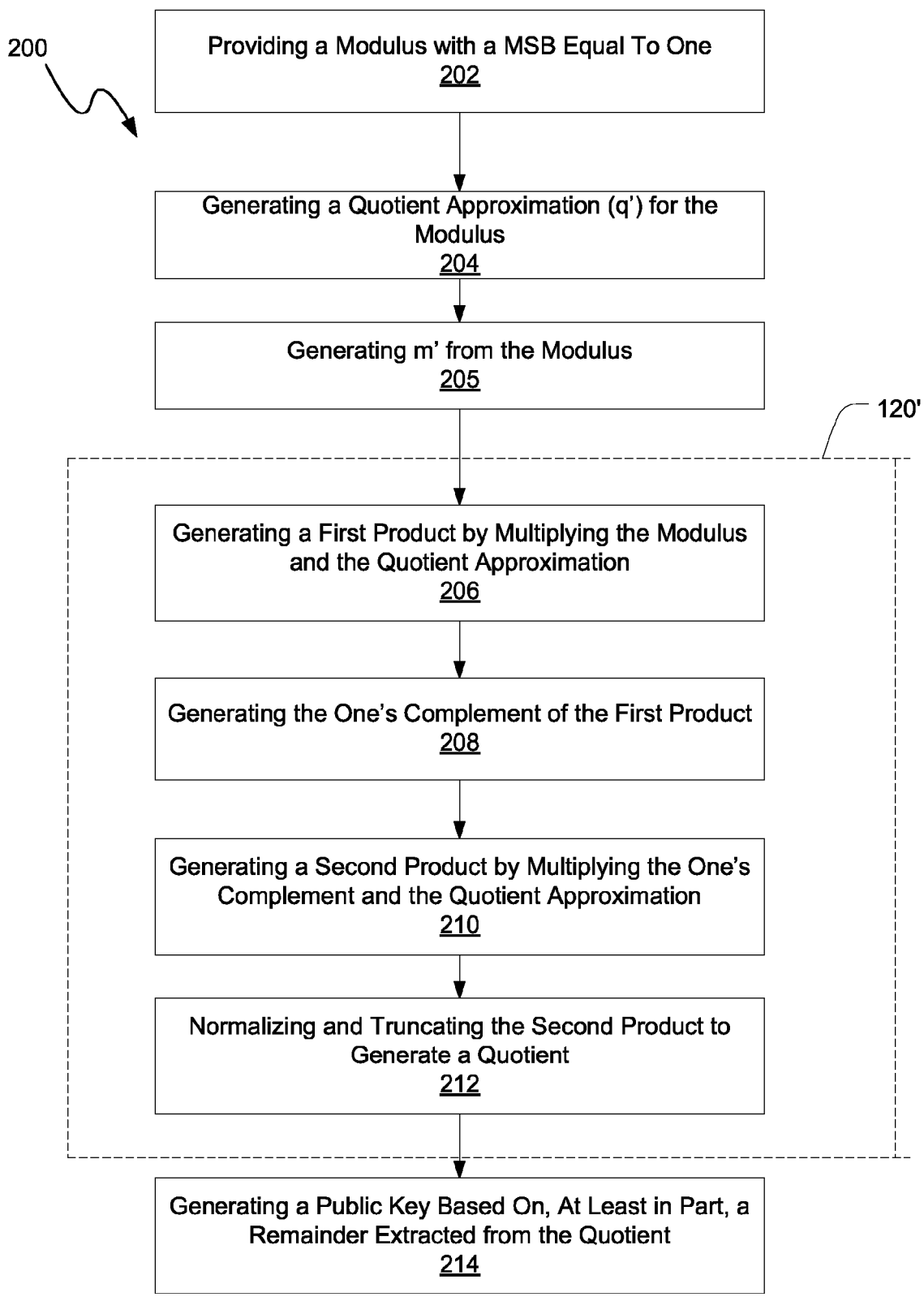
FIG. 2 is a flowchart showing operations in accordance with an another embodiment of the present disclosure.

FIG. 2 is a flowchart 200 illustrating another method consistent with the present disclosure. This embodiment of FIG. 2 is similar to the embodiment of FIG. 1, except that an initial modulus may be provided having the MSB equal to one (while the remaining bits can be all 0 or a mixture of 1's and 0's) and the initial modulus is not a multiple of 64 bits. Operations according to this embodiment may include generating a modulus (m) having a most significant bit (MSB) equal to one and having an odd number having a number of bits (t'), which is not a multiple of 64 bits 202. The modulus may generated in a similar fashion as described above with reference to FIG. 1. Operations according to this embodiment may also include generating a quotient approximation q' for the modulus (m') 204. Operations may further include generating a second modulus m' from the modulus 205. The second modulus m' may be derived from the modulus (m) by shifting m left logically until the number of bits is a multiple of 64 and then setting the LSB to 1. Accordingly, the quotient approximation q' may be related to the final quotient q give by $q'2^s < q$. Subtraction operations may be used to get the final quotient from q'.

Operations according to this embodiment may also include iterative operations 120', similar to the iterative operations 120 described above, to generate the final quotient. Operations may further include generating a first product by multiplying the modulus and the quotient approximation q' 206. The one's complement of the first product may then be obtained 208. The one's complement may be used to obtain an error term. A second product may then be generated by multiplying the one's complement of the first product with the quotient approximation 210. Each iteration 120 may perform the two vector multiplications described in 306 and 310. The second product may be normalized and truncated through a series of shifting operations to obtain a quotient 212. In some embodiments, once the second product is normalized and truncated it may be manipulated through a series of mathematical operations to double the accuracy of the quotient. Operations according to this embodiment may further include generating a public key using, at least in part, a remainder extracted from the quotient 214.

The operations described above with reference to FIGS. 1 and 2 may be extended to computing the general problem of division of d=A/B, either within the context of generating a public key during a key negotiation, or as general approach to solve large vector division. As a general matter, the reciprocal quotient estimate q=1/B may be generated to a desired accuracy (usually t bits, where t is the length of A). More precisely, the process may take the following form:

q1=floor($2^{2t}$/B)//this may be computed using the operations described above q2=q1*A q3=floor(q2/$2^{2t}$)

while (A−q3*B)>=B do {q3=q3+1;} d=q3.

Figure 3:
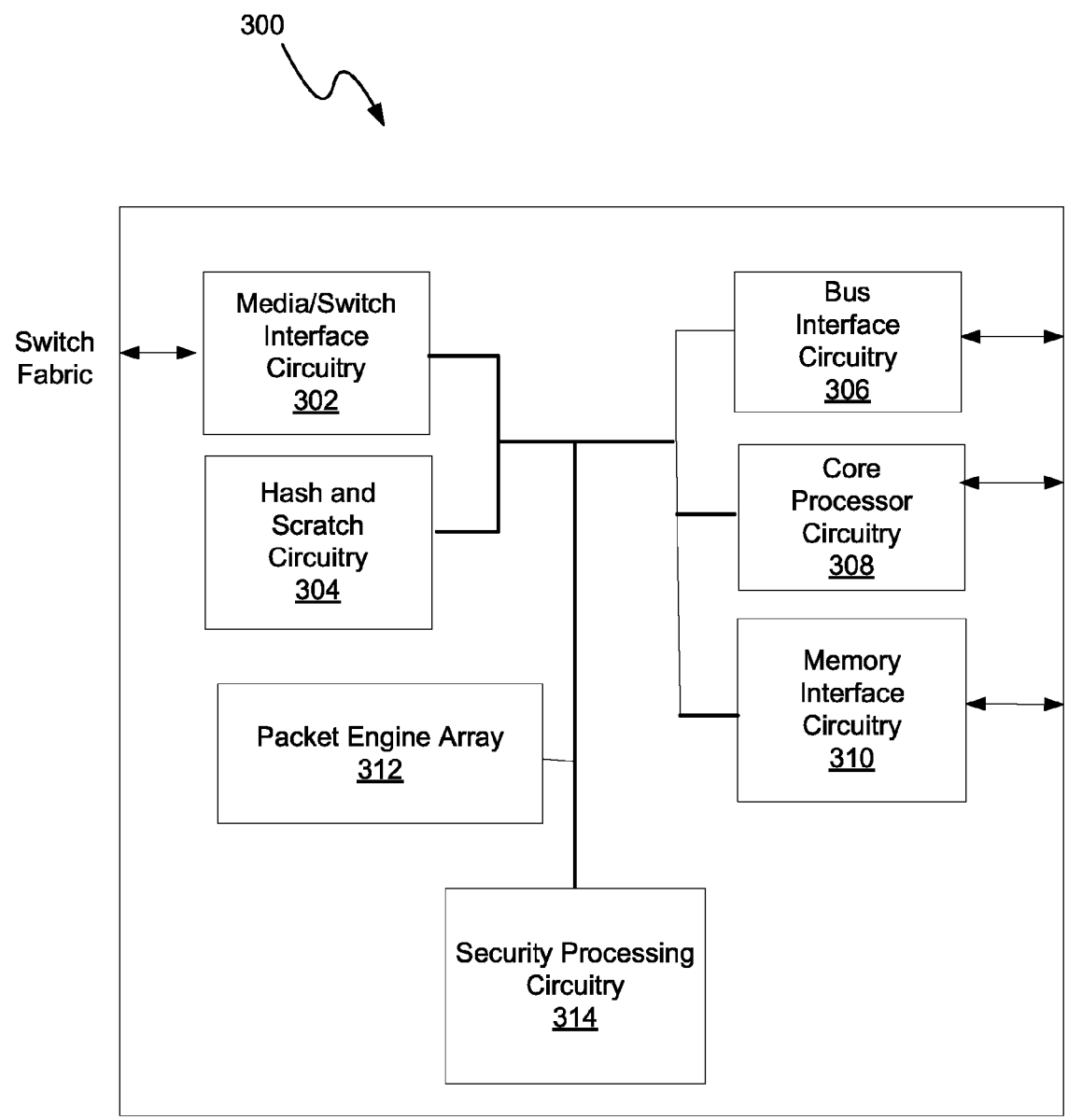
FIG. 3 is a block diagram depicting portions of a network processor in accordance with one embodiment of the present disclosure.

The methodology of the flowcharts of FIGS. 2-3 may be implemented, for example, in a variety of multi-threaded processing environments. For example, FIG. 3 is a diagram illustrating one exemplary integrated circuit embodiment (IC) 300 in which may be configured to perform the method of FIG. 1 and/or FIG. 2. "Integrated circuit", as used in any embodiment herein, means a semiconductor device and/or microelectronic device, such as, for example, but not limited to, a semiconductor integrated circuit chip. The IC 300 of this embodiment may include features of an Intel® Internet eXchange network processor (IXP). However, the IXP network processor is only provided as an example, and the operative circuitry described herein may be used in other network processor designs and/or other multi-threaded integrated circuits.

The IC 300 may include media/switch interface circuitry 302 (e.g., a CSIX interface) capable of sending and receiving data to and from devices connected to the integrated circuit such as physical or link layer devices, a switch fabric, or other processors or circuitry. The IC 300 may also include hash and scratch circuitry 304 that may execute, for example, polynomial division (e.g., 48-bit, 64-bit, 128-bit, etc.), which may be used during some packet processing operations. The IC 300 may also include bus interface circuitry 306 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from the IC 300 or external memory. The IC may also include core processor circuitry 308. In this embodiment, core processor circuitry 308 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 308 may comprise other types of processor core circuitry without departing from this embodiment. Core processor circuitry 308 may perform "control plane" tasks and management tasks (e.g., look-up table maintenance, etc.). Alternatively or additionally, core processor circuitry 308 may perform "data plane" tasks (which may be typically performed by the packet engines included in the packet engine array 318, described below) and may provide additional packet processing threads.

Integrated circuit 300 may also include a packet engine array 318. The packet engine array may include a plurality of packet engines. Each packet engine may provide multi-threading capability for executing instructions from an instruction set, such as a reduced instruction set computing (RISC) architecture. Each packet engine in the array 318 may be capable of executing processes such as packet verifying, packet classifying, packet forwarding, and so forth, while leaving more complicated processing to the core processor circuitry 308. Each packet engine in the array 318 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 300 may also include memory interface circuitry 310. Memory interface circuitry 310 may control read/write access to external memory. Machine readable firmware program instructions may be stored in external memory, and/or other memory internal to the IC 300. These instructions may be accessed and executed by the integrated circuit 300. When executed by the integrated circuit 300, these instructions may result in the integrated circuit 300 performing the operations described herein as being performed by the integrated circuit, for example, operations described above with reference to FIGS. 1-2.

Figure 4:
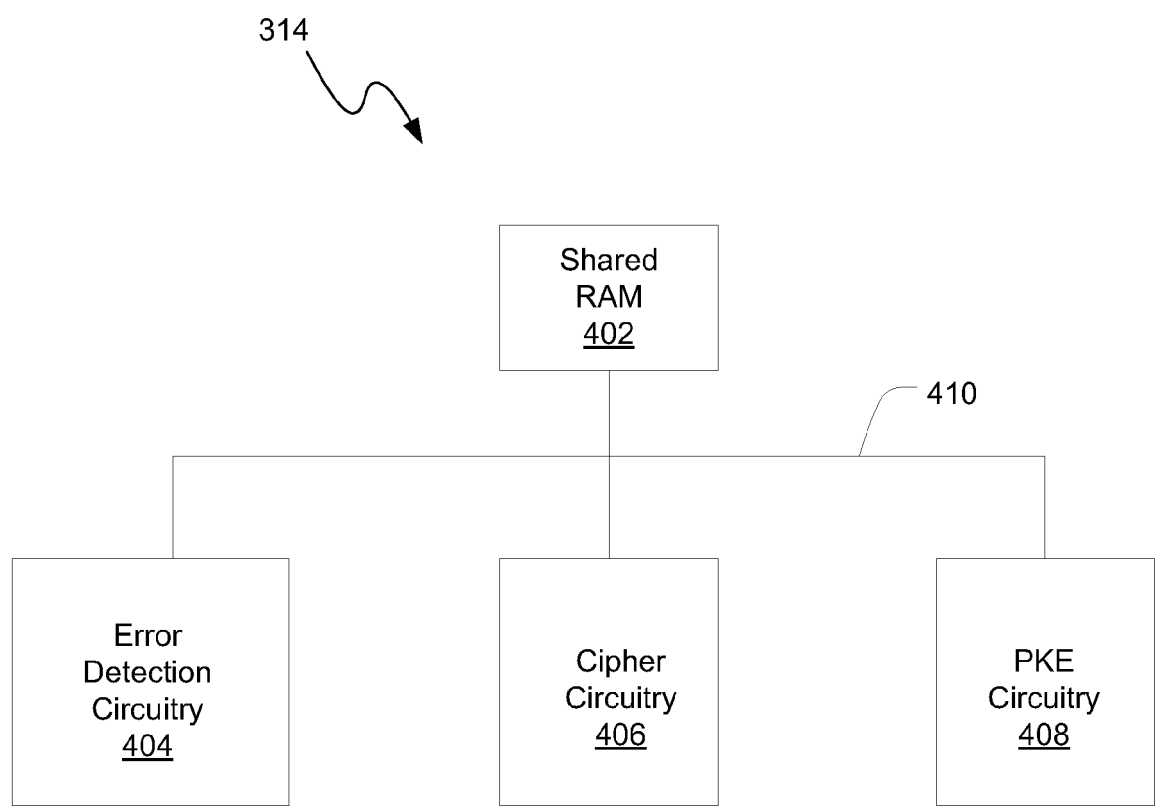
FIG. 4 is a block diagram showing further detail of a security processor in accordance with an embodiment of the present disclosure.

IC 300 may further include security processing circuitry 314. Security processor circuitry 314 may be configured to perform encryption operations which may include multi-precision division operations (as described above with reference to FIG. 1 and/or 2) for generating a public key. Referring now to FIG. 4, security processing circuitry 314 may include shared RAM 402 operatively connected to error detection circuitry 404, cipher circuitry 406 and public key encryption (PKE) circuitry 408 through internal bus 510. Error detection circuitry 404 may be configured to perform hash functions that may be used as a redundancy check or checksum. Some types of redundancy checks could include, but are not limited to, parity bits, check digits, longitudinal redundancy checks, cyclic redundancy checks, horizontal redundancy check, vertical redundancy checks, and cryptographic message digest. Security processing circuitry 314 may include both private and public key modules. Cipher circuitry 406 may be configured to generate private keys, which may include execution of symmetric and/or private-key data encryption algorithm such as the data encryption standard (DES) or advanced encryption standard (AES). PKE circuitry 408 may be configured to execute an asymmetric key encryption algorithm and may include generating a public-key/private-key pair.

Figure 5:
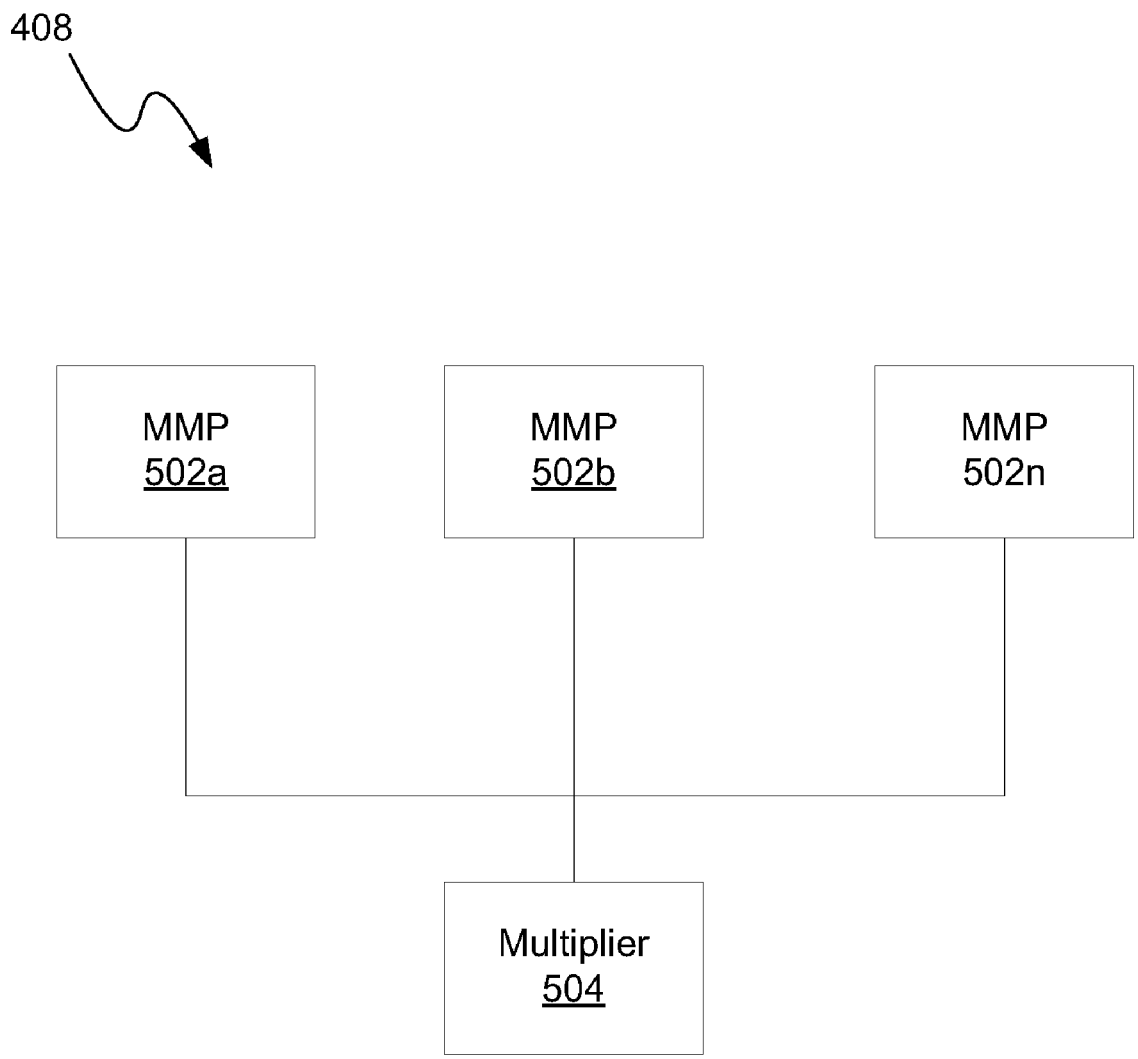
FIG. 5 is a block diagram showing encryption circuitry in accordance with an embodiment of the present disclosure.

One embodiment of PKE circuitry 408 is shown in FIG. 5. PKE circuitry 418 may include a plurality of modular math processors (MMPs) 502a, 502b, . . . , 502n. Each MMP may include at least one arithmetic logic unit (ALU) configured to perform vector operations. PKE circuitry 408 may further include a multiplier 504 operatively connected to modular math processors. In at least one embodiment embodiments, multiplier 504 may be a large (515×515) unsigned integer multiplier. PKE circuitry 408 may be used in accordance with the present disclosure to perform the mathematical operations and execute the methods described above with reference to FIG. 1 and/or 2.

Figure 6:
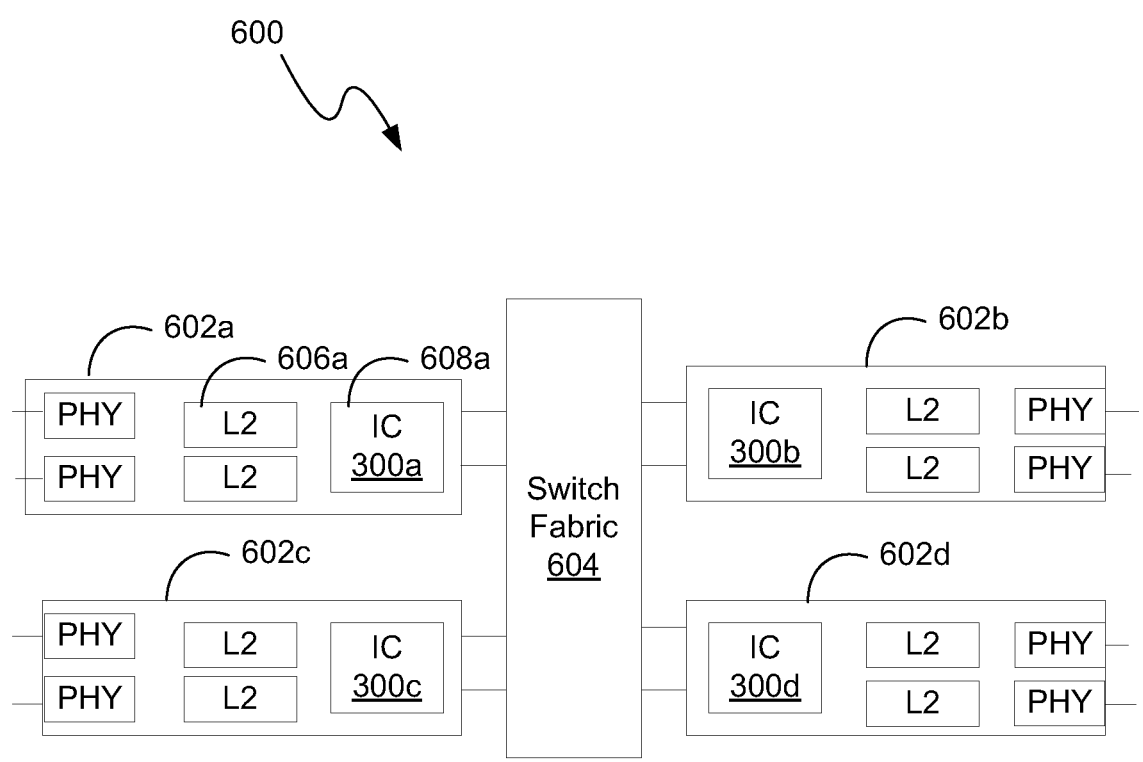
FIG. 6 is a diagram illustrating one exemplary system embodiment.

FIG. 6 depicts one exemplary system embodiment 600. This embodiment may include a collection of line cards 602a, 602b, 602c and 602d ("blades") interconnected by a switch fabric 604 (e.g., a crossbar or shared memory switch fabric). The switch fabric 604, for example, may conform to CSIX or other fabric technologies such as HyperTransport, Infiniband, PCI-X, Packet-Over-SONET, RapidIO, and Utopia. Individual line cards (e.g., 602a) may include one or more physical layer (PHY) devices 602a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 606a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 300a, which may include network processors, and may be embodied as integrated circuit packages (e.g., ASICs). In addition to the operations described above with reference to integrated circuit 300, in this embodiment integrated circuit 300a may also perform packet processing operations for packets received via the PHY(s) 602a and direct the packets, via the switch fabric 604, to a line card providing the selected egress interface.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

In alternate embodiments, the embodiment of FIGS. 3, 4, 5, and/or 6 may be configured as a "network device", which may comprise for example, a switch, a router, a hub, and/or a computer node element configured to process data packets, a plurality of line cards connected to a switch fabric (e.g., a system of network/telecommunications enabled devices) and/or other similar device. Also, the term "cycle" as used herein may refer to clock cycles. Alternatively, a "cycle" may be defined as a period of time over which a discrete operation occurs which may take one or more clock cycles (and/or fraction of a clock cycle) to complete. Additionally, the operations described above with reference to FIG. 1 and/or 2 may be executed on one or more integrated circuits of a computer node element, for example, executed on a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Accordingly, at least one embodiment described herein may provide a method for multi-precision division. The method may include generating a first product by multiplying a modulus having a most significant bit and/or a least significant bit equal to one and a quotient approximation of the modulus, generating the 1's complement of the first product, generating a second product by multiplying the 1's complement and the quotient approximation, normalizing and truncating the second product to obtain a quotient, and storing the quotient in memory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method for multi-precision division, comprising:
generating a first product using an integrated circuit by multiplying a modulus having a most significant bit and/or a least significant bit equal to one and a quotient approximation of the modulus;
generating the 1's complement of the first product using said integrated circuit;
generating a second product by multiplying the 1's complement and the quotient approximation using said integrated circuit;
normalizing and truncating the second product to obtain a quotient using said integrated circuit; and
storing the quotient in memory.

2. The method of claim 1, further comprising:
generating a public key based on, at least in part, a remainder extracted from the quotient using said integrated circuit.

3. The method of claim 1, wherein:
generating a quotient approximation includes a plurality of bit-serial calculations of reciprocal of the modulus using said integrated circuit.

4. The method of claim 3, wherein:
said bit-serial calculations are monotonic, and all intermediate results of said bit-serial calculations are non-negative integers.

5. The method of claim 1, wherein:
said modulus is selected from the group of a National Institute of Standards and Technology (NIST) modulus and a random modulus.

6. The method of claim 1, wherein:
said normalizing said second product includes shifting said second product by one bit.

7. An apparatus, comprising:
an integrated circuit (IC) configured to generate a first product by multiplying a modulus having a most significant bit and/or a least significant bit equal to one and a quotient approximation of the modulus, generate the 1's complement of the first product; generate a second product by multiplying the 1's complement and the quotient approximation, normalize and truncate the second product to obtain a quotient, and store the quotient in memory.

8. The apparatus of claim 7, wherein:
the IC is further configured to generate moduli used in RSA and/or Diffie-Helman key negotiation protocols.

9. The apparatus of claim 7, wherein:
the IC is further configured to generate a public key based on, at least in part, a remainder extracted from the quotient.

10. The apparatus of claim 7, wherein:
the IC is further configured to generate the quotient approximation using a plurality of bit-serial calculations of reciprocal of the modulus.

11. The apparatus of claim 10, wherein:
said bit-serial calculations are monotonic, and all intermediate results of said bit-serial calculations are non-negative integers.

12. The apparatus of claim 7, wherein:
said modulus is selected from the group of a National Institute of Standards and Technology (NIST) modulus and a random modulus.

13. The apparatus of claim 7, wherein:
the IC is further configured to normalize said second product by shifting the second product by one bit.

14. A computer readable storage medium comprising instructions stored thereon that when executed by a computer result in the following:
generating a first product by multiplying a modulus having a most significant bit and/or a least significant bit equal to one and a quotient approximation of the modulus;
generating the 1's complement of the first product;
generating a second product by multiplying the 1's complement and the quotient approximation;
normalizing and truncating the second product to obtain a quotient; and
storing the quotient in memory.

15. The computer readable storage medium of claim 14, further comprising generating a public key based on, at least in part, a remainder extracted from the quotient.

16. The computer readable storage medium of claim 14, wherein:
generating a quotient approximation includes a plurality of bit-serial calculations of reciprocal of the modulus.

17. The computer readable storage medium of claim 16, wherein:
said bit-serial calculations are monotonic, and all intermediate results of said bit-serial calculations are non-negative integers.

18. The computer readable storage medium of claim 14, wherein:
said modulus is selected from the group of a National Institute of Standards and Technology (NIST) modulus and a random modulus.

19. The computer readable storage medium of claim 14, wherein:
said normalizing said second product includes shifting said second product by one bit.

20. A system comprising:
a plurality of line cards and a switch fabric interconnecting said plurality of line cards, at least one line card comprising:
at least one physical layer component (PHY); and
an integrated circuit (IC) configured to generate a first product by multiplying a modulus having a most significant bit and/or a least significant bit equal to one and a quotient approximation of the modulus, generate the 1's complement of the first product; generate a second product by multiplying the 1's complement and the quotient approximation, normalize and truncate the second product to obtain a quotient, and store the quotient in memory.

21. The system of claim 20, wherein:
the IC is further configured to generate moduli used in RSA and/or Diffie-Helman key negotiation protocols.

22. The system of claim 20, wherein:
the IC is further configured to generate a public key based on, at least in part, a remainder extracted from the quotient.

23. The system of claim 20, wherein:
the IC is further configured to generate the quotient approximation using a plurality of bit-serial calculations of reciprocal of the modulus.

24. The system of claim 23, wherein:
said bit-serial calculations are monotonic, and all intermediate results of said bit-serial calculations are non-negative integers.

25. The system of claim 20, wherein:
said modulus is selected from the group of a National Institute of Standards and Technology (NIST) modulus and a random modulus.

26. The system of claim 20, wherein:
the IC is further configured to normalize said second product by shifting the second product by one bit.

* * * * *